Dec. 27, 1955 WEN YUAN PAN 2,728,853

OSCILLATOR CIRCUITS

Filed Nov. 20, 1952

INVENTOR.

WEN YUAN PAN

BY H. L. Newton

ATTORNEY

United States Patent Office 2,728,853

Patented Dec. 27, 1955

2,728,853

OSCILLATOR CIRCUITS

Wen Yuan Pan, Collingswood, N. J., assignor to Radio Corporation of America, a corporation of Delaware Application November 20, 1952, Serial No. 321,668

5 Claims. (Cl. 250—20)

The present invention relates to improvements in oscillator circuit arrangements and particularly although not necessarily exclusively to circuit and constructional arrangements for electronic oscillator circuits designated for operating in the ultrahigh frequency range such as to provide a relatively constant output voltage independent of operating frequency.

The present invention relates more directly to an improved oscillator circuit and in the physical arrangement of components comprising the same so as to provide an electronic oscillator capable of producing a stabilized output in the ultrahigh frequency signal range and adapted for use as a heterodyne oscillator in superheterodyne type of signal conversion systems.

The present invention also is concerned with improvements in the design of radio signal frequency converting mechanisms useful in the conversion of ultrahigh frequency (U. H. F.) signals to very high frequency (V. H. F.) whereby to extend the utility of radio receiving apparatus designed to receive only signals falling into the V. H. F. band.

As a result of recent Government allocation of television broadcast channels in the ultrahigh frequency radio spectrum, considerable engineering effort has been extended throughout the radio field to devise inexpensive frequency conversion equipment which will permit existing radio receivers adapted to receive V. H. F. television signals to successfully receive selected channels in the newly assigned ultrahigh frequency (U. H. F.) band. In order for the public to receive maximum benefit from the ultrahigh frequency (U. H. F.) television allocation, it is essential that the frequency conversion equipment offered to the public not only be inexpensive, thereby assuring widespread purchasing of conversion equipment and utilization of the allocated U. H. F. band, but the conversion equipment must be stable and reliable in operation.

The basic technique of signal conversion in which signals lying in one frequency band are through heterodyne action caused to occupy a position in another frequency band is well known in the art. Many circuit arrangements have been described in the prior art for use in radio frequency conversion. These equipments have ranged from types employing complex circuitry and construction of relatively high cost to simple arrangements which, because of low cost, must tolerate certain compromises in optimum engineering design.

One of the more pronounced problems in the design of frequency conversion equipment as its operating frequency is extended to the ultrahigh frequency range is that of local oscillator and heterodyne mixer circuit design. In U. H. F. to V. H. F. frequency conversion, the ultrahigh frequency signal which is to be converted is applied to the input of a non-linear signal mixing circuit in which a beat or heterodyne signal is developed. The heterodyne or beat results from the non-linear combining, i. e., vectorial multiplication, of the incoming U. H. F. signal with a local oscillator signal established in the U. H. F. range and differing in frequency from the received signal by an amount equal to the frequency of the V. H. F. channel to which the incoming signal is to be converted.

In changing from the reception of one ultrahigh frequency channel to another, it is generally necessary, therefore, to change the local oscillator frequency so as to maintain the V. H. F. beat at a constant value. In order to accomplish this, the local oscillator must be tunable over a range of frequencies which, depending upon the number of ultrahigh frequency channels to be received, may be quite broad. This will be immediately realized when it is considered that the newly asigned ultrahigh frequency television channels extend from 470 to 890 megacycles.

It is generally well known that as the operating signal frequency of an electron discharge tube oscillator increases, the margin of reliable and useful performance decreases. This is primarily due to the increased effect at higher frequencies of electron tube inter-electrode capacitances, lead inductances, transit time, etc. It is thus found that unless considerable cost is tolerated in the provision of specialized tube design for operation in and around 500 megacycles, the conversion efficiency of a converter circuit employing a standard electron tube oscillator will tend to decrease as operating frequency increases. This comes about by way of the fact that the conversion efficiency of a superheterodyne mixer circuit is dependent upon the maintenance of local oscillator signal amplitude within predetermined limits. This is particularly true if the mixer, per se, is of the silicon or germanium diode variety, in which the crystal current resulting from local oscillator excitation should be kept within one milliampere of the critical value in order to realize optimum signal conversion efficiency.

The present invention overcomes to a considerable extent the above noted problems in the provision of a simple local oscillator circuit suitable for operation at ultrahigh frequencies yet employing a conventional type of vacuum tube which will maintain an output terminal voltage substantially constant over a wide range of operating frequencies.

It is, therefore, an object of the present invention to provide an improved electrical signal frequency conversion circuit in which the conversion efficiency is made substantially independent of operating frequency over the range of frequencies for which the equipment is designed.

It is another object of the present invention to provide an improved oscillator and signal coupling means for use with heterodyne crystal mixer circuits such as to provide a relatively uniform amount of crystal excitation throughout a broad range of operating frequencies.

Still another object of the present invention is to provide an improved ultrahigh frequency oscillator which employs standard electronic parts and is low in manufacturing cost.

In the realization of the above objects, it is contemplated, in the practice of the present invention, to provide an electron discharge tube so connected as to sustain oscillation in the desired range of operating frequencies. Signal is then extracted from the oscillator circuit by means of a resistance element which is physically in proximity to a resonant tank circuit connected with the electron tube for determining its frequency of oscillation. By arranging the size of the resistance element including its associated lead lengths so as to be less than one half wave length of the operating frequency a compensatory coupling action may be realized in the oscillator circuit. As the operating frequency increases and electron tube efficiency decreases, the effect of electromagnetic or inductive coupling between the oscillator tank circuit and the resistance element increases, thereby tending to maintain the amplitude of the output signal substantially constant over a wide range of operating frequencies.

A more complete understanding of the present invention as well as a further appreciation of its objects and features of advantage will be obtained from a reading of the following specification, especially when considered in connection with the accompanying drawings, in which.

Figure 1:
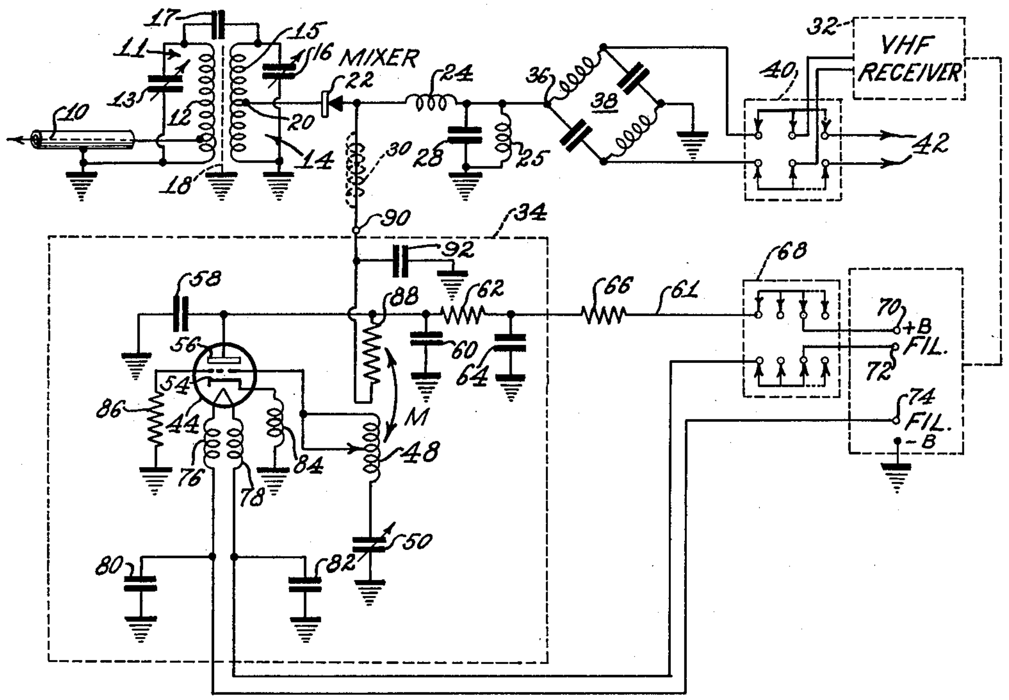
Figure 1 is a schematic circuit diagram of an ultrahigh frequency to very high frequency signal converter circuit incorporating an oscillator circuit embodying the present invention.

Referring now to the drawings wherein like reference characters represent like parts throughout and referring particularly to Figure 1, transmission line 10 is adapted to feed ultrahigh frequency carrier waves to a tunable radio frequency (R.-F.) signal selective circuit 11 which includes an inductor 12 and capacitor 13. A similar tunable R.-F. selector circuit 14, including an inductor 15 and capacitor 16 is coupled to the circuit 11 by means of the mutual inductance existing between the inductors 12 and 15.

Selective circuits 11 and 14 are further coupled together by the coupling capacitors 17. Grounded electrostatic shield 18 is indicated as being disposed between the inductors 12 and 15 so that the only capacitive coupling between the two circuits is provided by the capacitor 17.

The two tunable selective R.-F. circuits 11 and 14 are so conformed as to provide a band-pass characteristic which rejects superheterodyne image signals and the like. The tuned circuits 11 and 14 may be made very constant through the use of printed circuit techniques with the capacitors 13 and 16 being of the conventional tubular trimmer type. Capacitors 13 and 16 are adjustable so that the circuits 11 and 14 may be tuned to any ultrahigh frequency television channel. Through the use of both capacitive and inductive coupling between the two tuned circuits, fairly uniform bandwidths and good pass-band characteristics may be obtained through the ultrahigh frequency television band.

Incoming U. H. F. signals are extracted from a low impedance tap 20 on the inductor 15 and applied to a crystal mixer circuit including a crystal diode 22, inductor 24, inductor 25 and capacitors 28. The inductances 24 and 25, capacitance 28, inductance of lead 30 and capacitance 92 form a low-pass filter which prevents ultrahigh frequency energy from passing through the crystal mixer stage and producing undesirable interference on a beat frequency basis with local oscillator signal from the V. H. F. superheterodyne television receiver indicated in the block 32. Details of this particular feature of the mixer circuit are disclosed and claimed in a copending United States patent application by Wen Yuan Pan and H. M. Wasson, filed November 22, 1952, Serial No. 322,084, entitled "Signal Converter Circuit."

Local oscillator energy with which the incoming U. H. F. signal is heterodyned is developed by the oscillator circuit shown in the dotted line area 34 and is conveyed to the mixer 22 through the lead 30. The dotted line 34 also is meant to represent an electrical shield which electrostatically and electromagnetically isolates the elements within the dotted line area from the remaining circuit elements shown in the figure. The V. H. F. beat frequency produced by the mixing action of the diode 22 is conveyed through the low-pass filter described above to terminal 36 of the unbalanced input circuit to balanced output circuit bridge filter 38. The filter 38 provides two services: first, the conversion of the single ended or a balanced output arrangement of the mixer circuit to an unbalanced transmission line system for more direct use with existing V. H. F. television receivers and second, a frequency band-pass characteristic. A double pole-double throw switch 40 allows the application of the balanced output signal of the converter system to either the V. H. F. receiver 32 or to an external utilization means served by terminals 42.

The local oscillator 34 with which the present invention is more directly concerned, comprises an electron discharge tube 44 connected in a modified Colpits oscillator circuit. A series tuned circuit comprising the inductor 48 and capacitance 50 is connected between the control electrode 52 and circuit ground for determining the operating frequency of the oscillator. The well known split capacitances of a Colpits oscillator are defined between the control electrodes 52 and the cathode 54 as well as between the anode 56 and cathode 54. Capacitors 58 and 60 maintain the anode 56 at a very low impedance level with respect to chassis ground thereby tending to reduce oscillator radiation through the power supply line 61. Filter elements 62, 64 and 66 further discourage oscillator radiation via the "B" power supply system. Power supply switch 68 conditionally applies plus "B" voltage available at terminal 70 to the oscillator 34 as well as conditionally applying heater potential available at terminals 72 and 74 to the tube 44. Choke coils 76 and 78 acting in conjunction with by-pass capacitors 80 and 82 minimize radiation of oscillator signal over the heater supply lines. Cathode 54 of tube 44 is connected with chassis ground through the inductor 84 while a D.-C. return for the grid 52 is provided by the grid resistor 86.

In accordance with the present invention an output signal is derived from the oscillator 34 by means of a resistance such as a resistor 88 connected, in the embodiment shown in Figure 1, with the anode 56 of the oscillator tube 44. The resistor 88 is physically located near the inductor 48 thereby to establish a degree of electromagnetic coupling between the inductor 48 and the material comprising the resistor 88. Moreover, a degree of capacitive coupling may exist between these two elements. Resistor 88 couples the oscillator anode 56 to the output terminal 90 of the oscillator.

A capacitor 92 aids in reducing the terminal impedance of the output terminal 90. Signal energies developed at the terminal 90 are conveyed via circuit path 30, above described, to the crystal diode element 22.

In the operation of the present invention it will be evident that the operating frequency of the oscillator 44 may be varied over a considerable range by means of varying the values of inductor 48 and capacitor 50. As the operating frequency is made higher, the impedance of the capacitors 58, 60 and 92 will tend to decrease, thereby reducing the net voltage developed at the anode 56 of the oscillator tube. Furthermore, the oscillator tube itself will inherently tend to decrease its operating efficiency at the higher operating frequencies for reasons described above. By establishing a degree of electromagnetic coupling between the inductor 48 and the resistor 88 as described above, and by making certain that the physical length of the resistor including its associated leads are less than one half wave length of any operating frequency to be produced by the oscillator, the signal amplitude applied to the output terminal 90 will tend to increase with frequency. This tendency can be so balanced with respect to the opposite tendency of the circuit to reduce its signal output at higher operating frequencies as to provide a virtually constant signal output, over a very wide range of operating frequencies. It will also be recognized that stray capacitive coupling between the resistor 88 and the inductor 48 will also provide a degree of corrective action.

Figure 2:
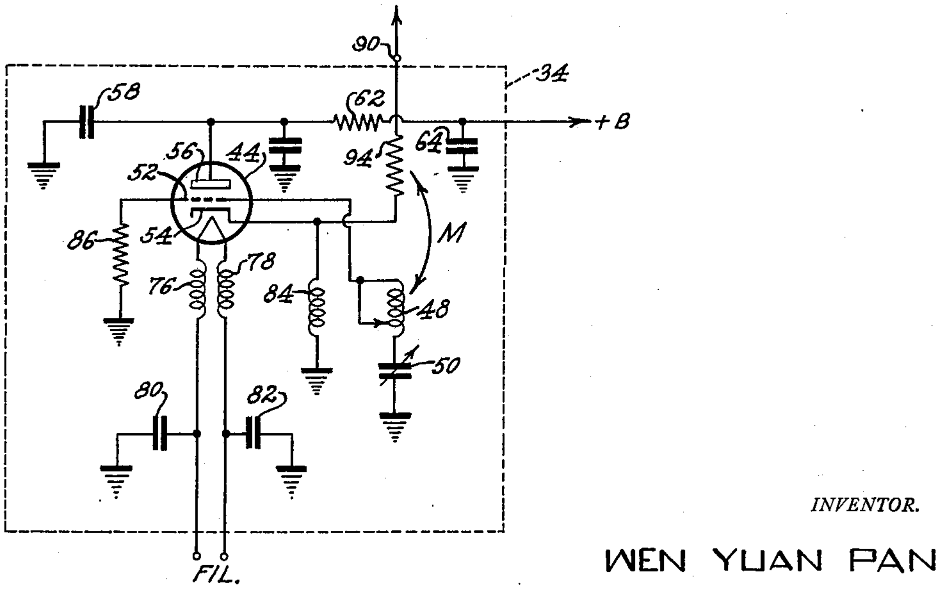
Figure 2 is a schematic circuit diagram of another oscillator circuit embodying the present invention.

Another embodiment of the present invention is shown in Figure 2. Here the oscillator tube 44 is connected in substantially the same fashion as shown in the dotted line area 34 described in connection with Figure 1. Accordingly, circuit elements of Figure 2 have been given similar numerical designations to those shown and described in Figure 1. In Figure 2, however, the oscillator signal takeoff resistor 94 is connected with the cathode element 54 of the tube 44. In this alternative form of practicing the present invention, the resistor 94 is so physically disposed with respect to the inductor 48 as to provide a degree of electromagnetic coupling whose efficacy increases with signal frequency whereby to maintain substantially constant output voltage at the output terminal 90 of Figure 2.

It is useful to note in connection with the practice of the present invention as shown and described hereinabove that the value of the coupling resistors 88 and 94 shown respectively in Figures 1 and 2 may be in the order of 100,000 ohms or more, in which case the effect of the coupling resistor at the higher operating frequencies is that of a capacitor having a value of approximately .5 micro-microfarad. However, the element itself, being resistive in nature, provides a sufficient physical mass of an electrically conductive nature to afford the inductive and/or radiation type pickup noted hereinabove.

It has also been found that among the many types of electron discharge tubes finding application in the embodiments of the invention described above, the commercial type 6AF4 provides excellent performance.

The crystal mixer 22 may be of the silicon type but is, in certain instances, preferably of the germanium type, inasmuch as germanium diodes are generally capable of withstanding higher inverse voltages and have the ability of self-healing in cases where the crystal element has been electrically broken down. One of the many available commercial type crystal rectifier devices finding successful use in the practice of the present invention is the CK-710 commercial crystal.

From the above, it can be seen that the present invention permits the construction of an inexpensive yet effective oscillator circuit, which, due to its constant output voltage relatively independent of large frequency changes, is ideally suited for use in connection with heterodyne type frequency conversion circuits.

Although the present invention has been described in connection with frequency conversion circuits generally known as of heterodyne or superheterodyne type, it will be understood that the utility of the novel features disclosed above and claimed hereinafter are in no way limited to this particular circuit environment.

What is claimed is:

1. In an ultrahigh frequency converter, the combination comprising a first resonant circuit means for selecting a predetermined ultrahigh frequency carrier wave, a source of ultrahigh frequency mixer waves including an electron discharge device having at least a control electrode and an output electrode, a second resonant circuit means comprising a series resonant circuit connected between said control electrode and a point of fixed potential, a crystal mixer connected across a portion of said first resonant circuit means, and coupling means between said source and said mixer including a capacitor connected between said output electrode and said point of fixed potential and a resistor connected between said output electrode and one terminal of said mixer, said resistor being inductively coupled to said second resonant circuit means whereby oscillator energy is induced in said resistor.

2. In an ultrahigh frequency converter, the combination comprising: resonant circuit means for selecting a predetermined ultrahigh frequency carrier wave, a source of ultrahigh frequency mixer waves, a crystal mixer connected in circuit with said resonant circuit means and said mixer wave source, said mixer wave source including an electron discharge device having at least a control electrode and an output electrode, a resonant oscillator frequency determining circuit connected between said control electrode and a point of fixed potential, and means for increasing the amount of oscillator energy received by said crystal mixer at the high frequency end of the tuning range covered by said frequency determining circuit comprising a conductive impedance element providing a direct circuit connection between said mixer and mixer wave source and being connected to said output electrode and inductively coupled to said resonant circuit whereby oscillator energy is induced in said element and applied therethrough to said mixer.

3. In an ultrahigh frequency converter, the combination comprising: resonant circuit means for selecting a predetermined ultrahigh frequency carrier wave, a source of ultrahigh frequency mixer waves, a crystal mixer connected in circuit with said resonant circuit means and said mixer wave source, said mixer wave source including an electron discharge device having at least a control electrode and an output electrode, a resonant oscillator frequency determining circuit connected between said control electrode and a point of fixed potential, and means for increasing the amount of oscillator energy received by said crystal mixer at the high frequency end of the tuning range covered by said frequency determining circuit comprising a conductive impedance element providing a direct circuit connection between said mixer and mixer wave source and said impedance element being connected to said output electrode and inductively coupled to said resonant circuit, the physical length of said impedance element being substantially less than one half wave length of the highest frequency mixer wave signal.

4. In an ultra high frequency converter, the combination comprising a signal selection circuit tunable to a frequency in the ultra high frequency band for selecting a predetermined ultra high frequency carrier wave, a tunable oscillator for providing a source of ultra high frequency waves including an electron discharge device, a frequency determining circuit for said oscillator, circuit means for connecting said frequency determining circuit with said discharge device to produce oscillations in said discharge device at a predetermined frequency, a signal mixer connected for receiving signal energy from said signal selection circuit and from said oscillator, and means for increasing the amount of oscillator energy received by said signal mixer at the high frequency end of the oscillator tuning range comprising a resistance element connected from said discharge device to said mixer and inductively coupled to said frequency determining circuit, the physical length of said resistance element including the lead length connecting said resistance element from said discharge device to said mixer being less than a half-wave length of the signal frequency at which the oscillator is made to operate.

5. An oscillator circuit for tuning over a wide range of ultra high frequency comprising the combination of a discharge tube having an input circuit and an output circuit connected therewith, resonant circuit means for coupling said input circuit with said output circuit for producing oscillation in said discharge tube at a predetermined frequency, said resonant circuit including an inductive element, an output terminal for connection with a utilization circuit, and means for increasing the amount of oscillator energy conveyed to said output terminal at the high frequency end of said range comprising a resistance element inductively coupled to said inductive element, said resistance element being connected from said discharge tube to said output terminal.

References Cited in the file of this patent

UNITED STATES PATENTS

| | | |
|---|---|---|
| 1,780,229 | Green | Nov. 4, 1930 |
| 2,017,020 | Seely | Oct. 8, 1935 |
| 2,272,851 | Ramsay | Feb. 10, 1942 |
| 2,291,428 | Wolf | July 28, 1942 |
| 2,568,416 | Scheer | Sept. 18, 1951 |
| 2,596,117 | Bell | May 13, 1952 |

FOREIGN PATENTS

| | | |
|---|---|---|
| 736,369 | France | Sept. 19, 1932 |